(12) United States Patent
Bouey et al.

(10) Patent No.: US 6,902,205 B2
(45) Date of Patent: Jun. 7, 2005

(54) COUPLING FOR COMPOSITE PIPE

(75) Inventors: Samuel Glen Bouey, Calgary (CA);
David W. McLeod, Cochrane (CA);
Chris A. Lundberg, Kingwood, TX (US)

(73) Assignee: Flexpipe Systems, Inc., Calgary (CA)

( * ) Notice: Subject to any disclaimer, the term of this patent is extended or adjusted under 35 U.S.C. 154(b) by 0 days.

(21) Appl. No.: 10/345,245

(22) Filed: Jan. 16, 2003

(65) Prior Publication Data

US 2005/0099004 A1 May 12, 2005

(51) Int. Cl.[7] .................................................. F16L 33/00
(52) U.S. Cl. ........................ 285/243; 285/259; 285/322
(58) Field of Search ................................. 285/383, 259, 285/34, 86, 148.17, 243, 242, 248, 322, 324, 382.7

(56) References Cited

U.S. PATENT DOCUMENTS

| | | | | |
|---|---|---|---|---|
| 1,098,294 A | * | 5/1914 | Patty | 285/259 |
| 2,120,275 A | * | 6/1938 | Cowles | 285/243 |
| 2,470,538 A | * | 5/1949 | Wolfram et al. | 285/382.7 |
| 2,544,712 A | | 3/1951 | Miller | |
| 2,694,584 A | * | 11/1954 | Miller | 285/259 |
| 3,222,091 A | * | 12/1965 | Marshall | 285/243 |
| 3,306,637 A | | 2/1967 | Press et al. | |
| 3,575,447 A | * | 4/1971 | Merkle | 285/248 |
| 4,212,487 A | * | 7/1980 | Jones et al. | 285/243 |
| 4,619,470 A | | 10/1986 | Overath et al. | |
| 4,643,457 A | | 2/1987 | Press | |
| 4,702,498 A | | 10/1987 | Mueller et al. | |
| 4,705,304 A | * | 11/1987 | Matsuda et al. | 285/243 |
| 4,906,030 A | * | 3/1990 | Yokomatsu et al. | 285/243 |
| 5,244,237 A | | 9/1993 | Harvey | |
| 5,676,174 A | | 10/1997 | Berneski, Jr. et al. | |
| 5,685,576 A | | 11/1997 | Wolfe et al. | |
| 5,988,702 A | | 11/1999 | Sas-Jaworsky | |
| 6,176,525 B1 | | 1/2001 | McMillan et al. | |
| 6,361,080 B1 | | 3/2002 | Walsh et al. | |

FOREIGN PATENT DOCUMENTS

| | | | | |
|---|---|---|---|---|
| CH | 461199 | * | 10/1968 | 285/243 |
| DE | DT 525374 | * | 5/1931 | 285/243 |
| GB | 2 258 895 A | | 2/1993 | |
| IT | 681903 | * | 2/1965 | 285/243 |

* cited by examiner

Primary Examiner—Aaron Dunwoody
(74) Attorney, Agent, or Firm—Bennett Jones LLP

(57) ABSTRACT

A pipe coupling and connector for use with composite pipe, and a method of coupling the end of composite pipe are disclosed. The coupling or connector has a cylindrical inner support with a gripping surface, a means for preventing axial movement of slips that are disposed around the gripping surface, and a coupling connector. The slips form an assembly with an outer frustoconical surface and an inner gripping surface. A hollow outer sleeve with a surface that corresponds to the frustoconical surface is used to drive the slips radially inwards so that the wall of the pipe is both compressed and gripped by the coupling. A retaining member holds the outer sleeve in a fixed position relative to the slips. The coupling, connector and method of this invention provide the structural integrity needed to ensure that the end of the pipe meets or exceeds the design ratings of the pipe.

69 Claims, 7 Drawing Sheets

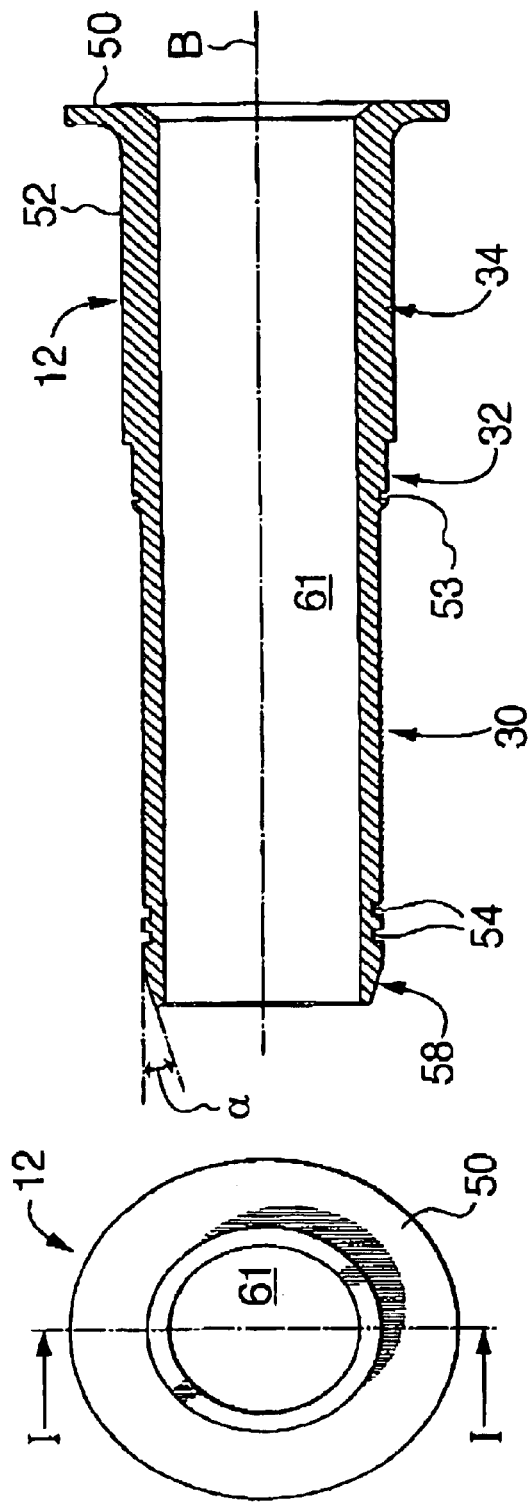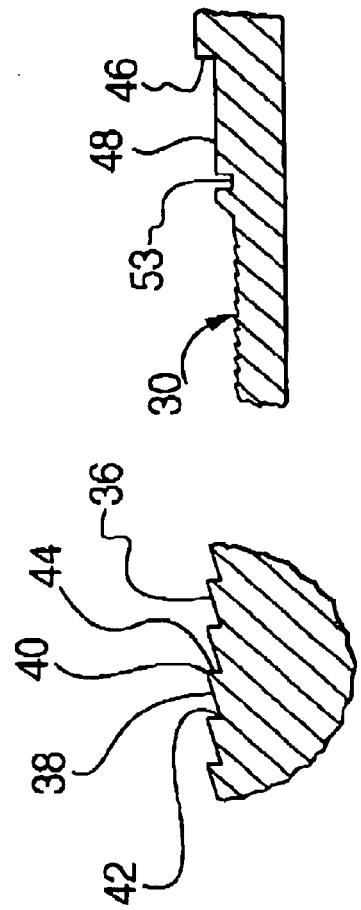

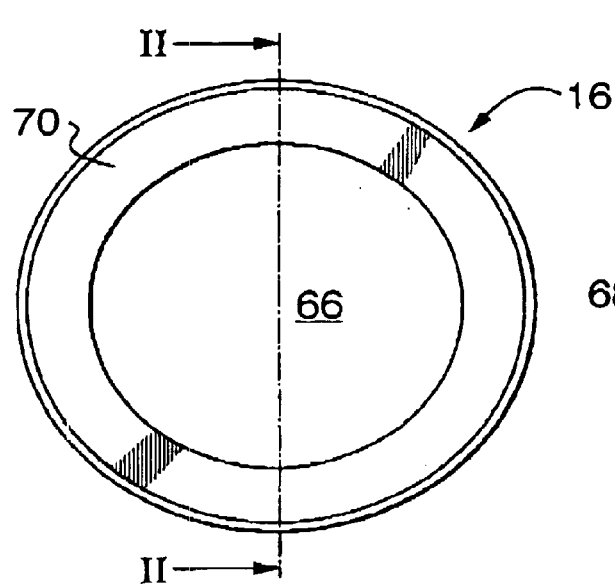
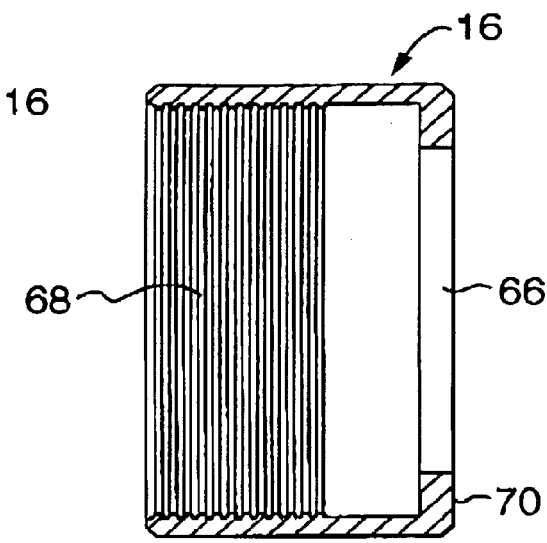
FIG. 4A  FIG. 4B
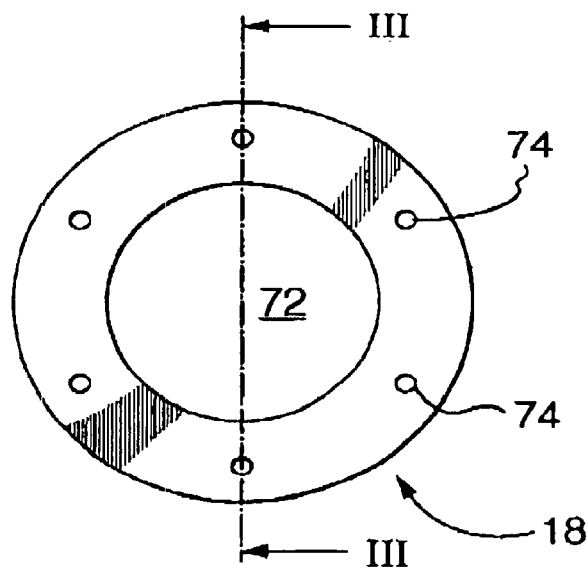
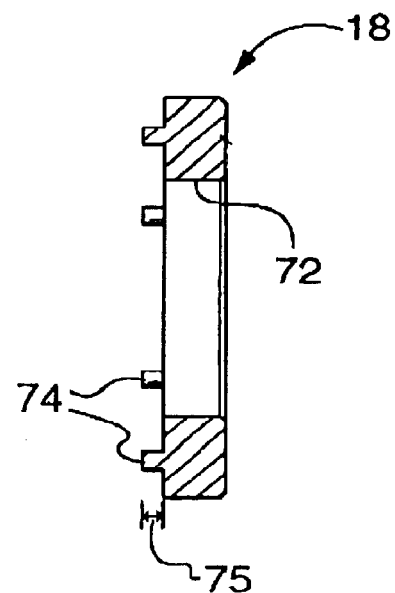
FIG. 5A  FIG. 5B

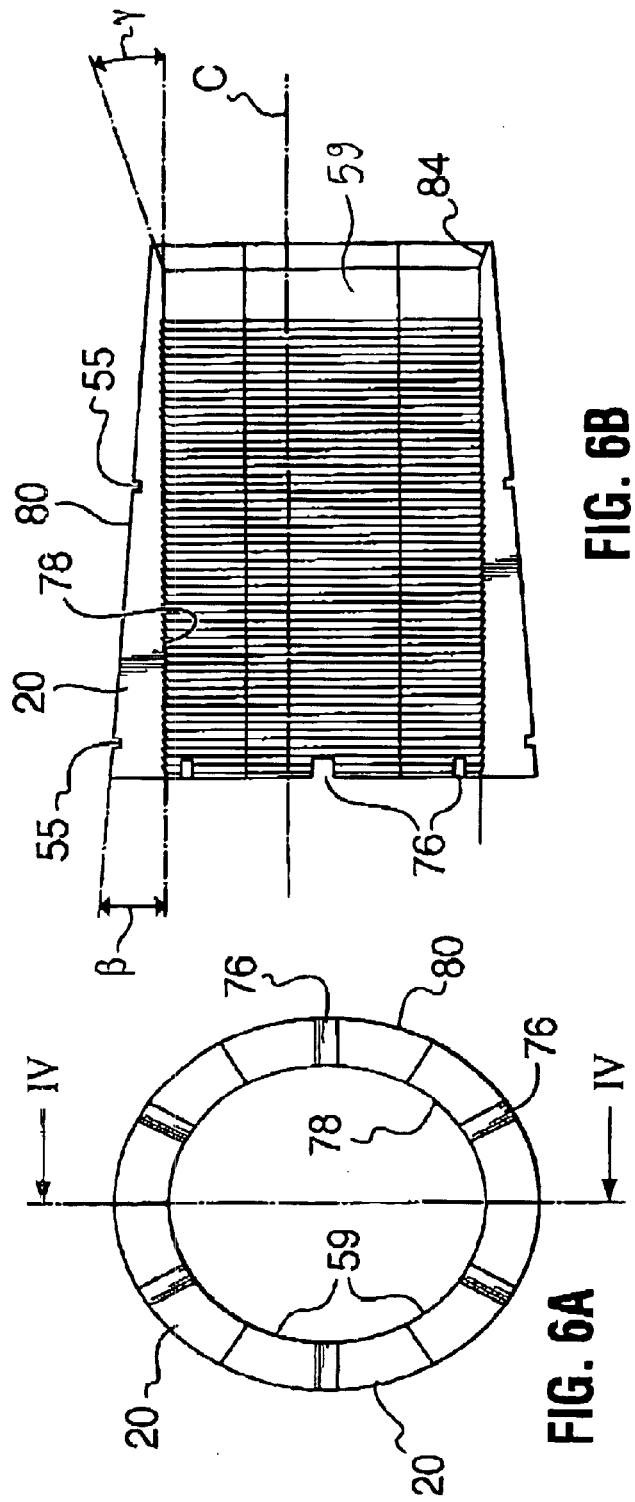
FIG. 6B
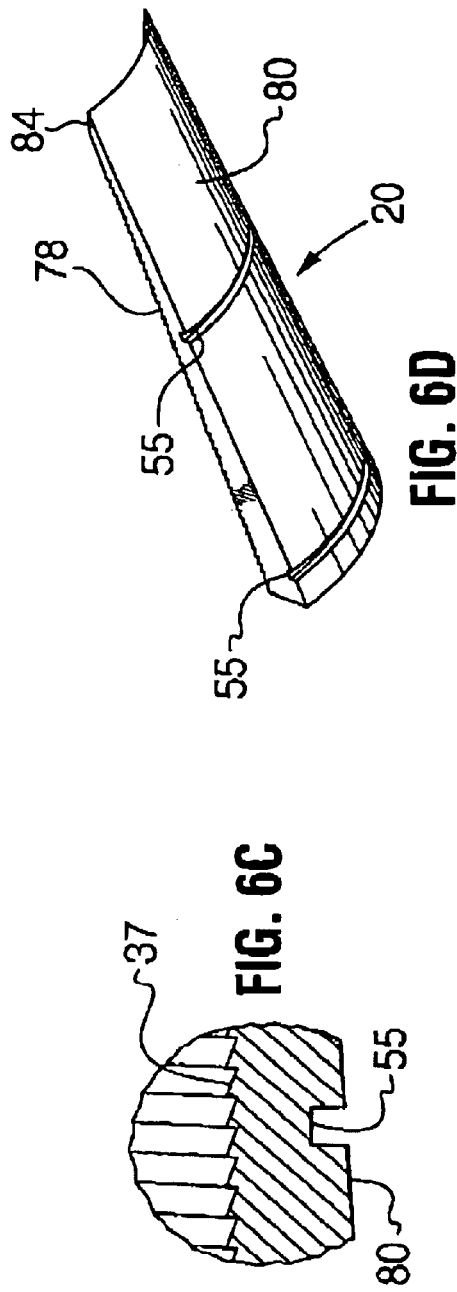
FIG. 6D
FIG. 6A
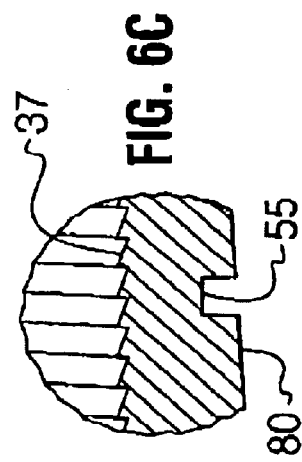
FIG. 6C

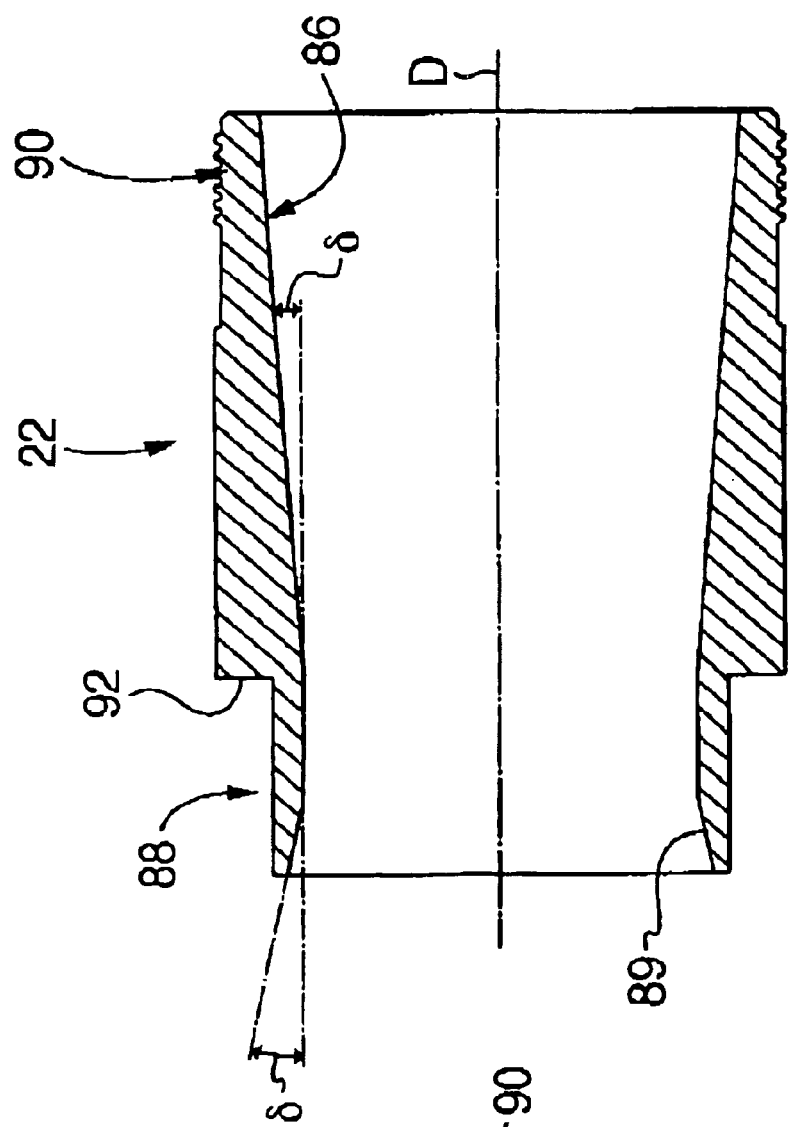
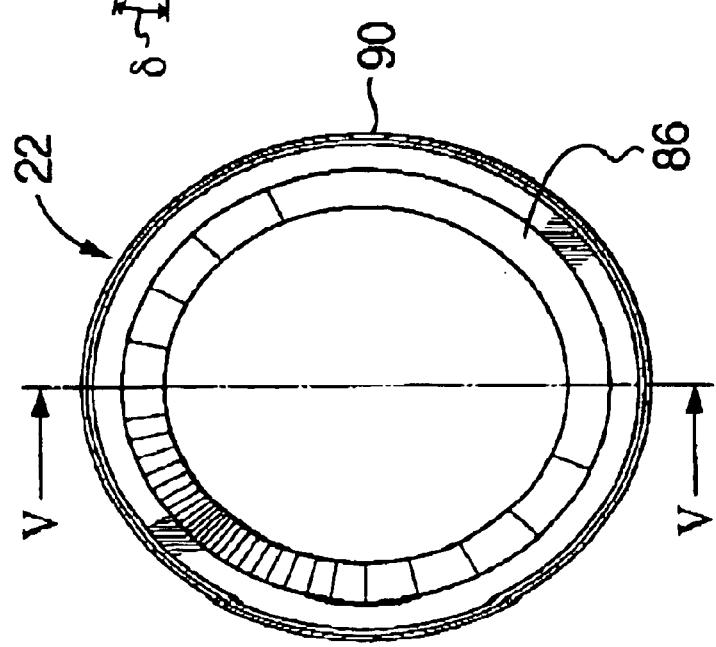
FIG. 7B
FIG. 7A

COUPLING FOR COMPOSITE PIPE

FIELD OF THE INVENTION

The present invention relates generally to the field of composite pipes, and in particular to a coupling for use with composite pipe and a method of installing a coupling onto composite pipe.

BACKGROUND OF THE INVENTION

Composite pipe, which for example is sometimes also referred to as fiber-reinforced plastic pipe or composite tubing, is well known in the art. These types of pipe are generally made of an internal layer of a polymeric material outer layers of reinforcing fibers and polymeric coatings. Composite pipe is particularly useful for conducting fluids in oil well operations, as it can be flexible and therefore spoolable, resulting in faster and more cost-effective installation than pipe strings which are assembled from sections of metallic pipe threaded together.

In oil well operations, the composite pipe may be exposed to aggressive chemicals and harsh conditions. With regard to the conditions that the pipe may be exposed to, the load on the pipe, resulting from external pressure, internal pressure and tension or compression forces can be very high. The composite pipe must be able to withstand these conditions.

Composite pipe is often used in a manner that requires coupling and uncoupling of the pipe at selected locations. A coupling for use with composite pipe must ensure that the coupled end of the pipe has at least the same structural integrity as the rest of the pipe. The installed coupling should equal or exceed the full design ratings of the pipe and in particular the maximum load to which the pipe will be exposed under normal operating conditions.

SUMMARY OF THE INVENTION

The coupling of the present invention is securable to an end of a composite pipe and may be used in any of a number of applications including end connectors, service or oil tool connectors and as a splice joint connector. When installed on a composite pipe, the coupling equals or exceeds the full design ratings of the pipe and in particular the maximum load to which the pipe will be exposed under normal operating conditions.

In one embodiment, this invention is a pipe coupling, comprising:
(a) a hollow cylindrical inner support having a longitudinal axis comprising:
  (i) a first gripping surface about a portion of the outside surface of the inner support,
  (ii) a means for supporting a coupling connector;
(b) a plurality of slips disposed about said first gripping surface, said plurality of slips forming an outer frustoconical surface and an inner cylindrical surface comprising a second gripping surface;
(c) a means for preventing the axial movement of said plurality of slips beyond a selected point;
(d) a hollow outer sleeve disposed about said plurality of slips, and comprising an inside surface corresponding to the frustoconical surface of the plurality of slips;
(e) a retaining member comprising a means for engaging the outer sleeve to reversibly fix the position of the outer sleeve relative to the plurality of slips, and
(f) a coupling connector disposed about said means for supporting a coupling connector.

In another embodiment, this invention is a splice joint connector, comprising:
(a) a hollow cylindrical inner support comprising
  (i) two first gripping surfaces about a portion of an outside surface, and
  (ii) two abutments disposed between the two first gripping surfaces,
(b) two slip assemblies formed from individual slips, each slip assembly being disposed about one of the first gripping surfaces and prevented from axial movement beyond a selected point by one of said abutments, and each slip assembly forming an outer frustoconical surface and an inner cylindrical surface comprising a second gripping surface;
(c) two hollow outer sleeves, each sleeve being disposed about one slip assembly and each sleeve comprising an inside surface corresponding to the frustoconical surface of the slip assembly about which it is disposed, and
(d) two retaining members, each said retaining member comprising a means for engaging one outer sleeve to reversibly fix the position of the one outer sleeve relative to the slip assembly about which the one outer sleeve is disposed.

In one embodiment, the coupling or connector additionally has a seal for sealing the space between the inner support and the pipe. In another embodiment the coupling additionally has a means for spacing the slips about the first gripping surface. In one embodiment this means is an interaction between the plurality of slips and the outer sleeve via projections on one of the outer sleeve or the plurality of slips, that extend into slots on the other of the plurality of slips or outer sleeve. In one embodiment the means for spacing the slips is a slip-positioning element. In one embodiment the slip-positioning element and the plurality of slips interact via projections on one of the slip-positioning element or the plurality of slips, that extend into slots on the other of the slip-positioning element or the plurality of slips. In yet another embodiment, the coupling or connector includes a snap ring that holds the slip-positioning element on the inner support. In another embodiment, the retaining member and outer support threadedly engage to reversibly fix the position of the one outer sleeve relative to the slip assembly.

In another aspect, this invention is a method of installing a coupling connector onto the end of a flexible pipe, said pipe defining a bore and having an inner surface, an outer surface and a wall, comprising:
(a) providing a hollow cylinder having a longitudinal axis, and having an external gripping surface at one end, a coupling connector at the other end, and an abutment disposed therebetween;
(b) inserting the external gripping surface into the bore of the pipe;
(c) disposing a plurality of slips about the outer surface of the pipe at a position opposed to the external gripping surface of the cylinder and at a position adjacent to the abutment, said plurality of slips forming an outer frustoconical surface and an inner cylindrical surface comprising an internal gripping surface;
(d) forcing an outer sleeve axially onto the plurality of slips, along the longitudinal axis, thereby:
  (i) causing the slips to move axially until restrained by the abutment;
  (ii) compressing the wall of the pipe between the slips and the cylinder;
  (iii) causing the external gripping surface of the cylinder to grip the inner surface of the pipe, and (iv) causing the internal gripping surface of the slips to grip the outer surface of the pipe, and (e) reversibly fixing the position of the outer sleeve relative to the plurality of slips with a retaining element.

In one embodiment, the method includes using a seal to seal the space between the cylinder and the pipe. In another embodiment the method additionally includes using a means to space the slips about the outer surface of the pipe. In one embodiment, this means is a slip-positioning element. In another embodiment the slip-positioning element and the plurality of slips interact via projections on one of the slip-positioning element or the plurality of slips, that extend into slots on the other of the slip-positioning element or the plurality of slips. In yet another embodiment, the method includes using a snap ring to hold the slip-positioning element in place. In another embodiment, the outer sleeve is reversibly fixed relative and plurality of slips with a retaining element that threadedly engages the outer sleeve.

BRIEF DESCRIPTION OF THE DRAWINGS

FIG. 3 shows several views of an embodiment of the inner support. FIG. 3A is an end view from flange 50 end. FIG. 3B is a longitudinal section taken along line I—I of FIG. 3A. FIGS. 3C and 3D are enlarged views of portions of the longitudinal section, as indicated on FIG. 3B.

FIG. 4 shows two views of an embodiment of the retaining element. FIG. 4A is an end view from shoulder 70 end. FIG. 4B is a longitudinal section taken along line II—II of FIG. 4A.

FIG. 5 shows two views of an embodiment of the slip-positioning element. FIG. 5A is an end view. FIG. 5B is a longitudinal section taken along line III—III of FIG. 5A.

FIG. 6 shows several views of an embodiment of the slip members. FIG. 6A is a bottom end view of the plurality of slips. FIG. 6B is a longitudinal section taken along line IV—IV of FIG. 6A. FIG. 6C is a detailed view of a portion of the longitudinal section, as indicated on FIG. 6B. FIG. 6D is a perspective view of one slip.

FIG. 7 shows two views of an embodiment of the outer sleeve. FIG. 7A is an end elevation. FIG. 7B is longitudinal section taken along live V—V of FIG. 7A.

DETAILED DESCRIPTION OF PREFERRED EMBODIMENTS

Figure 1:
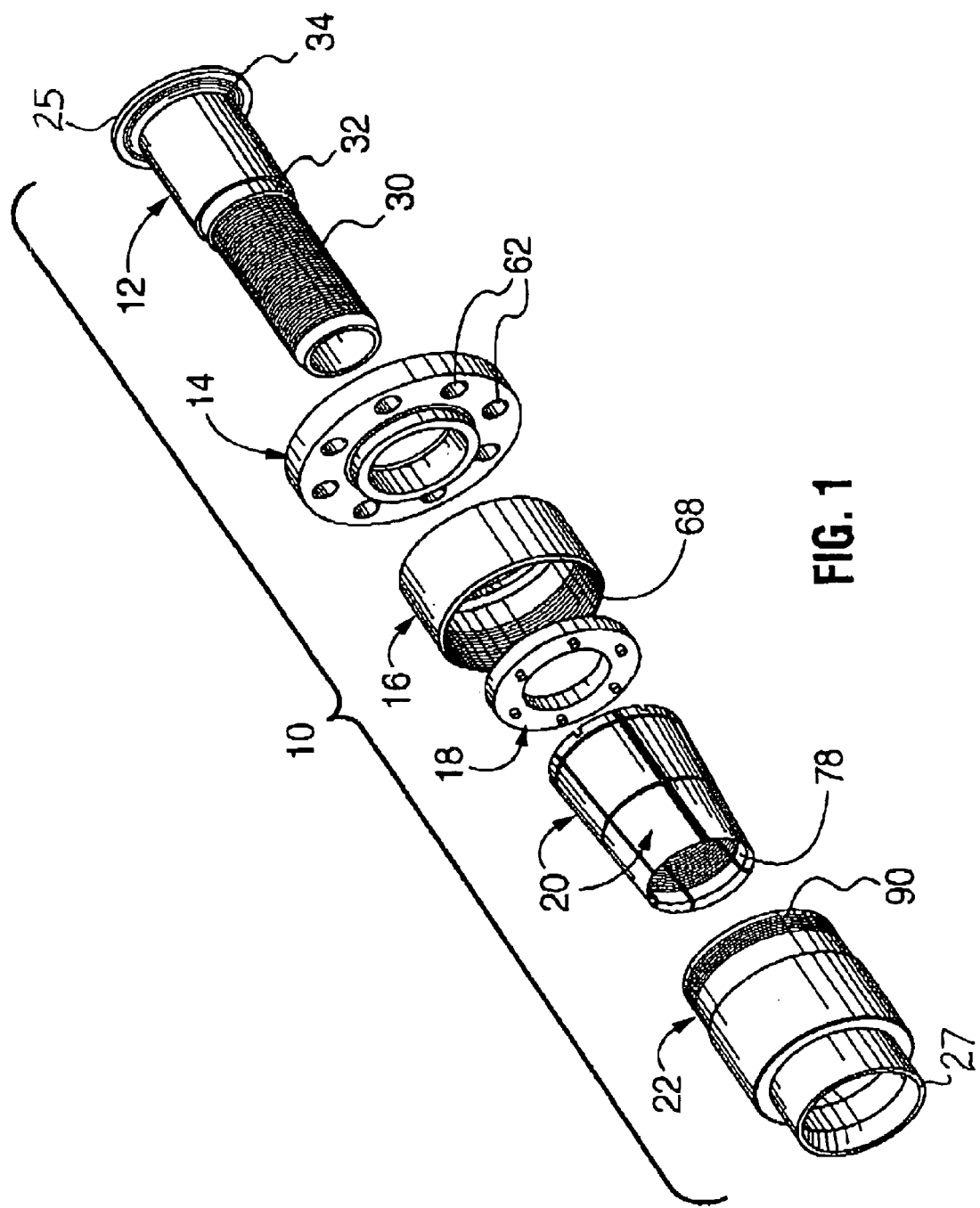
FIG. 1 is an exploded view of an embodiment of the coupling of this invention.
Figure 2:
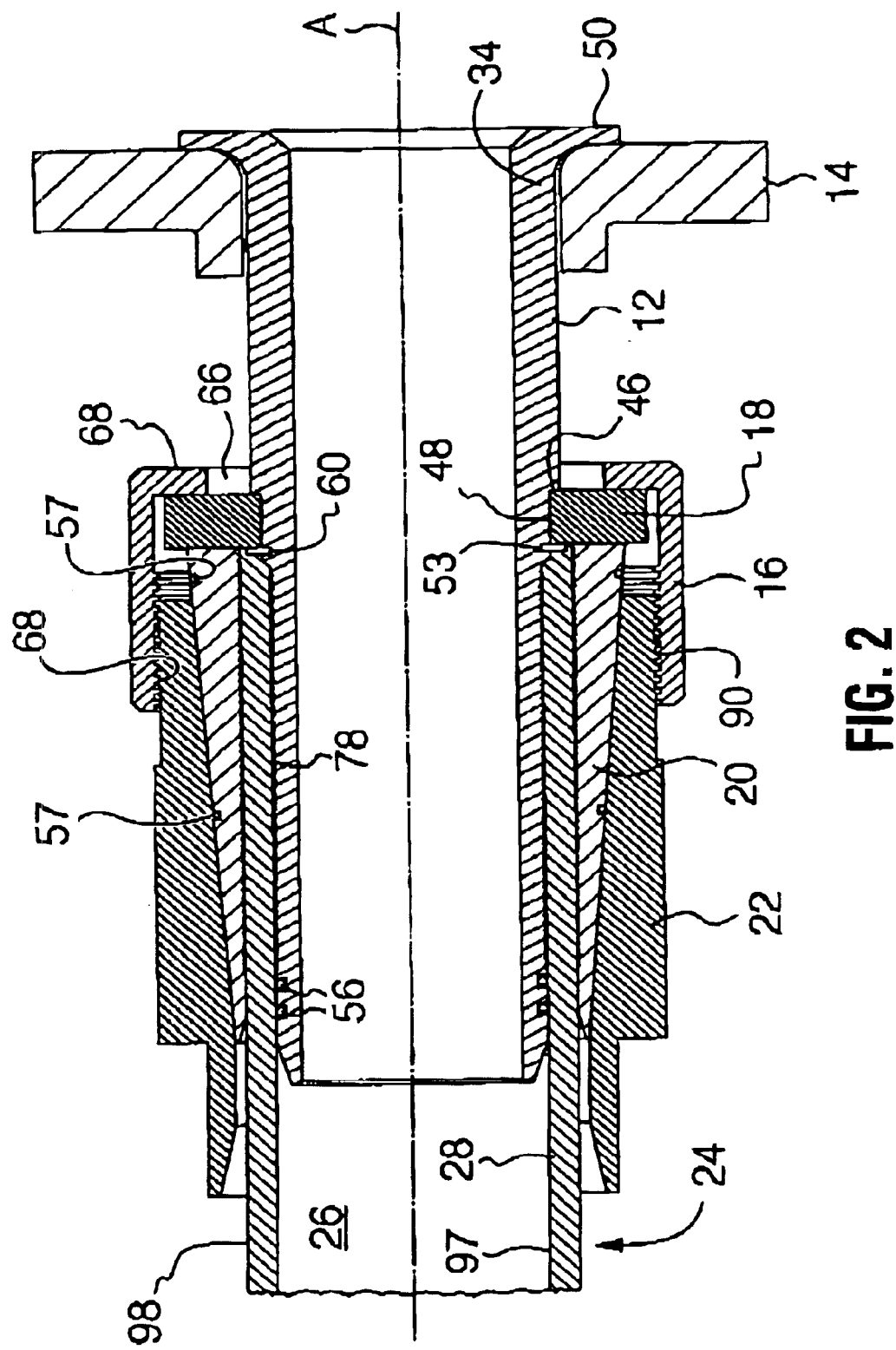
FIG. 2 is a cross-sectional view of an embodiment of the assembled coupling of this invention installed on the end of a composite pipe.

Reference will now be made to FIGS. 1–7, which show an embodiment of coupling 10 of this invention and elements thereof. This embodiment of coupling 10 has an inner support 12, a coupling connector 14, a retaining element 16, a slip-positioning element 18, a plurality of slips 20 and an outer sleeve 22. FIG. 2 shows coupling 10 of this invention mounted onto a composite pipe 24 with a wall 28 that defines a bore 26. Typically, all parts of coupling 10 are made of carbon steel or other high strength alloys, such as for example stainless steel alloys or high strength metals such as titanium. The metal may be protected by a polymeric coating to prevent corrosion. For ease of reference, end 25 is referred to as the "coupled end", and end 27 is referred to as the "inserted end" of coupling 10, respectively.

As best shown in FIG. 3, inner support 12 has three general portions: an external gripping portion 30, an abutment portion 32 and a portion 34 for supporting coupling connector 14. The main function of inner support 12 is to act as a foundation on which slips 20 act, for engagement of the end of pipe 24. Inner support 12 additionally functions to grip surface 97 of pipe 24, to support coupling connector 14 and to support slip-positioning element 18, if used.

Gripping portion 30 is sized to fit within bore 26 of pipe 24, such that the surface of the gripping portion will contact surface 97 during insertion of inner support into the bore of the pipe. The outer diameter of gripping portion 30 is therefore sized to achieve a size-on-size fit. A properly-sized gripping portion 30 will be sufficiently large to prevent buckling of the pipe 28 or seals 56, when coupling 10 is installed on the end of pipe 24, which buckling would lead to the formation of a leak path. In a typical composite pipe, the inner diameter of the pipe varies slightly from one position to the next. An outer diameter of gripping portion 30 that is midway between the upper and lower end of the tolerance of the diameter of bore 26 has been found to be a suitable outer diameter for the gripping portion.

The insertion of inner support 12 into pipe 24 should ideally require the application of some force, which indicates that the diameter of inner support 12 is sufficiently large to prevent buckling of wall 28 or seals 56. Grease may be applied to inner support 12 or surface 97 to assist with the insertion of inner support 12, and additionally, a hydraulic press may be used to insert the inner support into pipe 24.

In one embodiment of gripping portion 30, the gripping portion is formed with a plurality of teeth 36, as shown in detail in FIG. 3C. In this embodiment, teeth 36 have surfaces 38 that face the inserted end of the coupling, and extend at a gradual angle relative to longitudinal axis B of inner support 12, from a tip 40 to the bottom of a valley 42. A second surface 44 that faces the coupled end of the coupling, extends from tip 40 to the bottom of valley 42 at a much more abrupt angle to axis B. The slope of surfaces 38 and 44 cause the teeth 36 to self-energize to engage surface 97 of wall 28, and thereby to resist the movement of inner support 12 out of bore 26 after it has been inserted therein. Teeth 36 should not cut through or otherwise damage the thermoplastic pipe liner. In this regard, the spacing between teeth 36 is selected to ensure that the load that is transferred from the surface 97 of pipe 24 is transmitted along a continuous shear plane that is parallel to the longitudinal axis A of pipe 24. Finally, the greater the interface between surface 97 and teeth 36, the greater will be the ability of teeth 36 to transfer shear stress from surface 97.

In the embodiment shown in FIGS. 1–3, teeth 36 are circumferential rings that extend transversely about the outer surface of inner support 12. The valleys 42 separate adjacent teeth 36 from one another. Other types of teeth are intended to be included herein, for example teeth that are spaced from one another in circumferential and/or longitudinal rows. Additionally, roughening or cross-hatching may be used in the gripping portion 30, if it would provide the required ability to transfer shear stress from pipe 24.

A second portion of inner support 12, shown in detail in FIG. 3D, is abutment portion 32, the purpose of which is to restrict the axial movement of slips 20, as described below. Additionally, it properly positions slip-positioning element 18, if this element is used. Portion 32 has an abutment 46 and a hub 48, in the area where slip-positioning element 18 will be located when the coupling is assembled, as shown in FIG. 2. Abutment 46 provides a positive stop that prevents further axial movement of the plurality of slips 20 away from the inserted end of the coupling, when being acted upon by outer sleeve 22. Therefore, abutment 46 functions in the creation of the wedge-lock between outer sleeve 22 and the plurality of slips, 20.

Hub 48 fits relatively snugly in bore 72 of slip-positioning element 18, to thereby axially align slip-positioning element 18. Groove 53 houses a snap ring 60 (FIG. 2) that is used to hold slip-positioning element 18 onto inner support 12.

The third portion of the inner support 12 is portion 34, which supports coupling connector 14. As shown in FIG. 3B, portion 34 has a flange 50 and a hub 52. The diameter of flange 50 is greater than the bore of coupling connector 14, and therefore flange 50 prevents the separation of coupling connector 14 from the coupled end of the assembled coupling 10. The diameter of hub 52 may be selected to be a size over which a standard American National Standards Institute (ANSI) flange, such as a lapped joint flange, may fit.

Coupling connector 14 slides over inner support 12 to abut flange 50. It functions to connect coupling 10 of this invention to other articles or devices, such as other couplings. As shown in FIG. 1, coupling connector 14 may be a disk shaped flange with a plurality of bolt-holes 62. As such, it may be coupled to a corresponding flange by tightening bolts positioned through corresponding bolt holes of both flanges, as is commonly known in the art as a stub-end connection. Although shown in FIGS. 1 and 2 as being connectable with bolts, a flange that connects to other flanges in a different manner such as by threading the flanges directly to one another, by clamping or by welding, is intended to be included herein.

One feature of this embodiment of coupling 10 is that coupling connector 14 is able to spin about inner support 12, thus enabling the end user to readily line up coupling connector 14 with the corresponding connector to which it will be coupled. In this regard therefore, this coupling is easier to use than a coupling that has coupling connector 14 fixed to, or integral with, inner support 12. When the coupling connector is fixed to, or integral with, the inner support 12, more care is required to ensure that the inner support 12 is lined up and remains lined up during the installation of the coupling, with the connector to which it will be attached. If there is significant misalignment, the inner support must be removed and reinserted, which potentially damages and thereby potentially weakens wall 28 of pipe 24. Despite this, it is noted that coupling connector 14 may be fixed to, or integral with the body of inner support 12 and this embodiment is intended to be included herein.

Inner support 12 may additionally have one or more glands 54, in which may be mounted seals 56 that seal off the space between inner support 12 and surface 97 of pipe 24. Additionally, inner support 12 includes a tapered end 58 as shown in FIG. 3B, which facilitates the insertion of inner support 12 into pipe 24 in a manner that will not damage the inner lining of pipe 24. The angle of displacement of the surface of end 58 from the longitudinal axis B of inner support 12 is represented by α, which is generally selected to be sufficient to provide a gradual increase in the outer diameter of the inner support 12.

After inner support 12 is inserted into bore 26 of pipe 24, slips 20 are positioned around the outer circumference of pipe 24, and outer sleeve 22 is driven down onto slips 20 to force them to move inwards. This inward movement of slips 20 causes wall 28 of pipe 24 to be compressed between, and gripped by, slips 20 and inner support 12. The inward movement of slips 20 continues until a wedge-lock that securely grips the wall of the pipe is formed, after which the slips are held in place with retaining element 16.

FIGS. 1 and 6 show an embodiment of the plurality of slips 20 useful in coupling 10. Each slip 20 is wedge-shaped, as can best be seen in FIG. 6D. FIG. 6A is a view from the bottom (i.e. wide edge) of the plurality of slips 20. When assembled around a pipe 24 the plurality of slips 20 form a wedge-shaped annular slip assembly, with an inner surface that forms essentially a cylindrical shape and an outer surface that forms essentially a frustoconical shape.

The inner surfaces 59 of slips 20, when in use in coupling 10, should cover as much of the circumferential distance of pipe 24 as possible, without contact between the axial edges of slips 20 and without pinching or bulging of surface 98 of the pipe. The inventors construct slips 20 from a solid cylinder, the inner diameter of which is selected to be essentially the same as the outer diameter of the compressed pipe when it is fully clamped. Slips cut from these solid cylinders have proven to be suitable for use in coupling 10, as described in the example herein.

As is apparent, the number of slips 20 used in coupling 10 will vary depending upon the diameter of the pipe. Further, a different number of slips 20 may be used in different couplings that are intended for use with a pipe of the same size. The use of more rather than less slips is preferred because, as more slips are used, the clamping force about the pipe becomes more evenly distributed. However, the number of slips has to be balanced against the difficulties associated with using smaller and more numerous slips, such as difficulties with spacing the slips or with the sturdiness of the slip itself.

A plurality of slips 20 is preferred over a wedge-shaped collet in the coupling of this invention because a plurality of slips is generally capable of larger radial displacement than is a wedge-shaped collet. One of the important forces used in coupling 10, to help ensure that the coupling will remain on pipe 24, is the force of compression acting on wall 28 of pipe 24. Inner support 12 and the plurality of slips 20 must fit within and about pipe 24 respectively, so that when the wedge-lock is established, wall 28 is compressed. The compressive force, in addition to the engagement of teeth 36 and 37 into the wall of pipe 24, transfers the load from the pipe to coupling 10. In this regard, a composite pipe to be used with the coupling of this invention will ideally have a low radial stiffness, or in other words, a wall 28 that compressible and will not be damaged by the application of the forces used to install coupling 10 on the pipe. In one embodiment, approximately 30 to 35 tons of compressive (axial) force, is applied when installing coupling 10 on the end of pipe 24 and the radial clamping pressure is 8,000 to 10,000 psi.

Each slip 20 has an inner surface 78 and an angled surface 80. Angled surface 80 meets inner surface 78 at an angle β, which can be between 1° and 15°. The considerations in choosing angle β are the amount of axial travel that will occur when outer sleeve 22 is driven onto slips 20, and the amount of force required to assemble the coupling onto the pipe end. The inventors have found that an angle β of about 4°+/−0.25° will work on a coupling to be used with a pipe that has an outer diameter of about 4 inches.

A portion, or all, of inner surface 78 is formed to grip the outside surface 98 of pipe 24, and in the embodiment shown has teeth 37 extending along most of its length, the structure of which are shown in detail in FIG. 6C. Teeth 37 are essentially the same as described above for the teeth 36 on gripping portion 30 of inner support 12. As shown in the Figures herein, teeth 37 on inner surface 78 are opposed to teeth 36 of gripping portion 30, in the assembled coupling 10. However, teeth 37 need not be opposed to teeth 36 in the assembled coupling.

The length of slips 20 is a relevant consideration, because it is important that coupling 10 not destroy the structural integrity of wall 28 of pipe 24. A certain amount of compressive force must be applied to wall 28. As pressure is defined as force divided by area, the longer the slips 20 are, the lower will be the pressure experienced by the part of the wall 28 that is directly adjacent to the slips 20 that are driven radially inward by outer sleeve 22. As is apparent, in order to apply the same magnitude of compressive force to wall 28, shorter slips 20 will apply a higher pressure on wall 28 than will longer slips 20, and they may therefore damage wall 28 of pipe 24. The inventors have found that slips 20 of seven inches in length are useful in a coupling for a pipe with an outer diameter of about 4 inches.

FIGS. 1, 6B and 6C also show that slip 20 may additionally have one or more grooves 55 into which O-rings 57, that are used primarily to hold the slips 20 together during installation, are placed. As shown in FIG. 1, grooves 55 are aligned among the plurality of slips 20.

Slips 20 may include a chamfer end 84, as shown in FIG. 6B. The angle of displacement of the surface of end 84 from the longitudinal axis C of slip 20 is represented by arrow γ in FIG. 6B. The tapering of this end of the slips 20 provides a gradual increase in the diameter of the coupling to avoid an abrupt transition that may create a relative point of weakness in wall 28, and in particular cause damage to an outer polymeric coating of the pipe 24.

The proper spacing of the slips 20 about the outer circumference of pipe 24 may be facilitated by using slip-positioning element 18, which interacts with the slips 20 and functions to space the slips around pipe 24. As shown in FIGS. 1 and 5, slip-positioning element 18 may be a ring-shaped structure that defines a bore 72 and which has extending from one surface a number of projections 74. Bore 72 is sized to fit snugly over hub 48 of inner support 12. Projections 74 extend from the surface of slip-positioning element 18 that faces the inserted end of coupling 10. These projections fit into corresponding slots 76 on the slips 20 (FIG. 6A). The insertion of projections 74 into slots 76 on slips 20 spaces the slips a selected distance from one another in assembled coupling 10.

As is apparent, the number, spacing and shape of the projections can differ from what is shown in FIGS. 1 and 5. Alternatively, the projections 74 may be located on slips 20 and slots 76 on slip-positioning element 18. Or, the means of positioning slips 20 may be different than is shown in these Figures, but with the same result. For example projections 74 may be located between slips 20 rather than within slots in the slips. Or they may be located on outer sleeve 22, and interact with slots 76 on angled surface 80 of slips 20, thereby eliminating the need to have a separate slip-positioning element. All of these means of positioning the slips are intended to be included herein. Additionally, it is noted that it is possible to use the coupling of this invention without using a means to position plurality of slips 20. However, the preferred embodiment of coupling 10 includes a means of positioning the plurality of slips 20.

Once assembled around pipe 24, the slips 20 are driven radially inwards by action of outer sleeve 22. FIGS. 1, 2 and 7 show an embodiment of outer sleeve 22 of coupling 10. Outer sleeve 22 has a frustoconical-interacting surface 86, a pipe portion 88, a threaded portion 90, and a shoulder 92. The primary function of outer sleeve 22 is to cooperatively engage the frustoconical surface of the plurality of slips 20 and to drive the slips radially inwards to form a wedge-lock that secures wall 28. Additionally, outer sleeve 22 interacts with retaining element 16 to maintain the wedge-lock, and it is the point of exit of pipe 24 from coupling 10.

Frustoconical-interacting surface 86 is tapered at an angle complementary to the angled surfaces 80 of slips 20. The angle of displacement of the frustoconical-interacting surface from the longitudinal axis D of outer sleeve 22 is represented by arrow δ. In one embodiment, angle δ is 4° +/−0.25°.

Pipe portion 88 is the portion of outer sleeve 22 from which pipe 24 exits coupling 10. Pipe portion 88 may have a chamfer end 89, as shown in FIG. 7. The angle of displacement of surface of end 89 from the longitudinal axis D of outer sleeve 22 is represented by ε in FIG. 7B. The tapering of this end of the outer sleeve 22 provides a gradual increase in the diameter of the coupling to avoid an abrupt transition that may create a relative point of weakness in wall 28, and in particular, cause damage to the outer polymeric coating of pipe 24.

Outer sleeve 22 is driven axially onto the plurality of slips 20 with a force sufficient to establish a wedge-lock, but without causing significant damage to the pipe 24. "Significant damage" as used herein means damage that would compromise the structural integrity the pipe 24 so that it would not function according to its full design ratings. Couplings for use on different pipes may require the application of different amounts of force, however an indication that too much force has been applied is that pipe 24 will leak. This damage could be to one or more of the layer of reinforcing material, the inside polymeric layer, or the outside polymeric coating.

When outer sleeve 22 is driven axially onto the plurality of slips 20 thereby forcing the slips radially inward, teeth 37 on inner surfaces 78 of slips 20 will penetrate into surface 98 of pipe 24. In a composite pipe where wall 28 is comprised of an outside polymeric coating covering the reinforcing fibers, teeth 37 penetrate only into the coating and not into the reinforcing fibers. Additionally, teeth 36 on inner support 12 will be forced into stronger gripping engagement with surface 97 of wall 28. It is both the gripping engagement of teeth 36 and 37 with surfaces 97, 98 of wall 28 and the compression of wall 28 between slips 20 and inner support 12, that is necessary to ensure that coupling 10 has sufficient tensile load strength remain attached to the end of pipe 24.

The force that is applied to outer sleeve 22 in order to create the wedge-lock will be applied substantially along the longitudinal axis A of coupling 10, and substantially evenly about the circumference of coupling 10. In one embodiment, the force may be applied directly on the chamfer end 89 of outer sleeve 22. However, preferably shoulder 92, shown in FIG. 7, is used to assist with the application of the force required to drive outer sleeve 22 onto slips 20. In particular, the force is applied to shoulder 92 and therefore pipe portion 88 of outer sleeve 22 protects surface 98 of pipe 24 from being damaged by the instrument or machine used to apply the force. One means of generating sufficient force to create the wedge-lock is with a hydraulic press.

Once the wedge-lock has been established, retaining element 16 functions to hold outer sleeve 22 in position relative to the plurality of slips 20. As shown in FIGS. 2 and 4, retaining element 16 can be a collar that defines a bore and has a threaded portion 68 and a radially inwardly extending shoulder 70 defining a central opening 66. Retaining element 16 slides over coupling connector portion 34, and in the assembled coupling 10 shown herein, shoulder 70 abuts slip-positioning element 18 on the side of element 18 that faces the coupled end of the coupling. Therefore, when retaining element 16 is threadedly engaged via threaded portion 68, to outer sleeve 22 this abutment against element 18 permits retaining element 16 to prevent the movement of, or rather, reversibly fix the position of, outer sleeve 22 relative to the plurality of slips 20. In another embodiment, outer sleeve 22 may be fixed in position relative to the plurality of slips 20 by a retaining element that comprises two flanges, one on outer sleeve 22 and the other on inner support 12, which flanges are secured to one another with bolts. This embodiment might be used, for example, if there is no retaining element 18, and slips 20 abut abutment 46 directly.

In the embodiment shown in FIG. 2, bore 66 has a greater diameter than the outer diameter of coupling connector portion 34. This embodiment is preferred because the clearance compensates for a non-concentric fit of outer sleeve 22 on inner support 12.

However, shoulder 70 could be extended so that bore 66 fits snugly over coupling connector portion 34, but in this event more care would have to be taken to ensure that there is a concentric fit between the sleeve and inner support.

Figure 8:
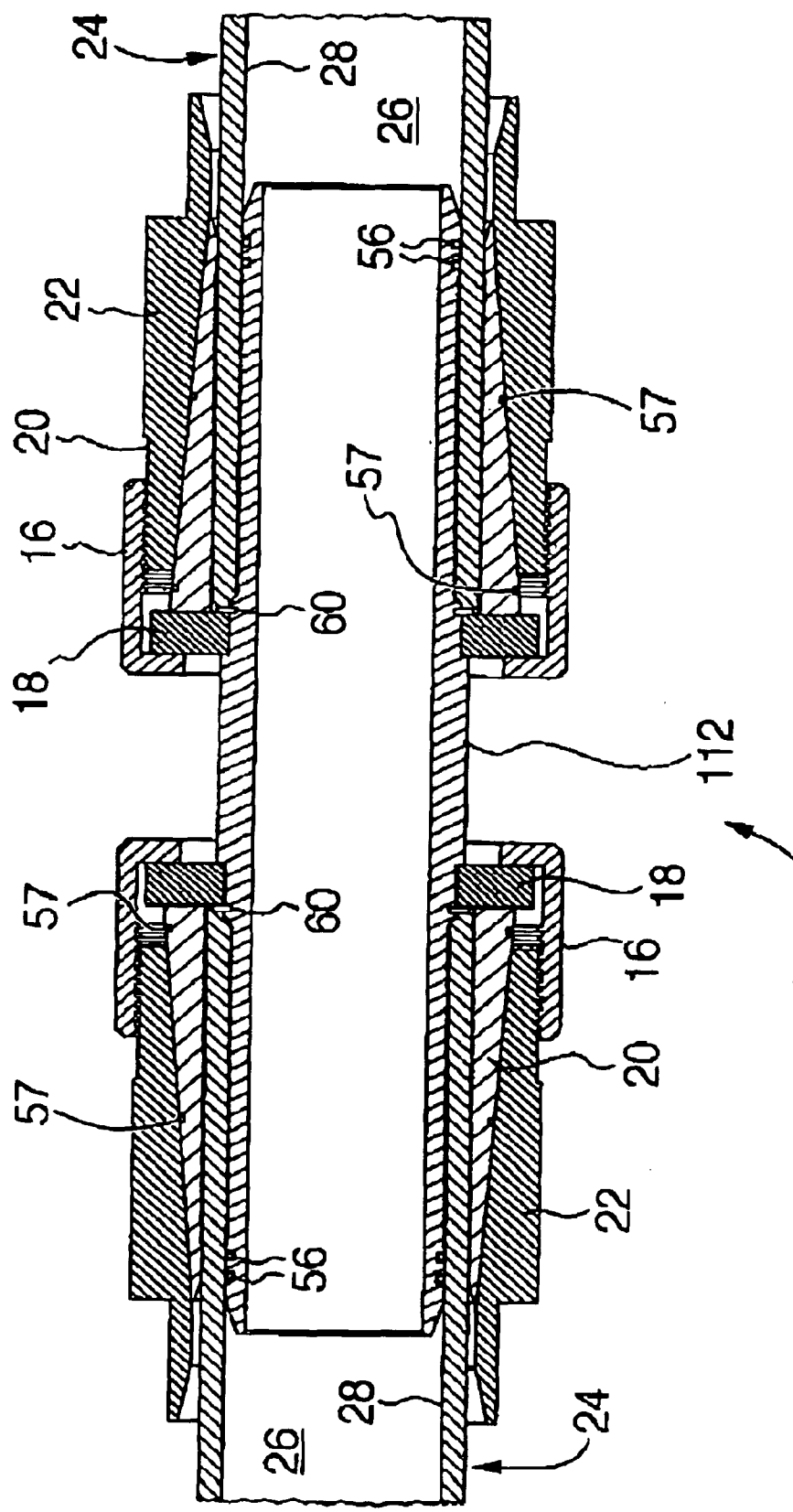
FIG. 8 is a view of an alternative embodiment of the invention which is used as a splice joint connector.

FIG. 8 shows an alternative embodiment 110 of the coupling of this invention, which is intended for use as a splice joint connector, rather than an end fitting. Coupling 110 differs from coupling 10 in that portion 34 of inner support 12 is removed, and two inner supports with portion 34 thus removed are joined together end to end, as shown in FIG. 8. As shown in FIG. 8, coupling 110 has two retaining elements 16, two slip-positioning elements 18, two pluralities of slips 20 and two outer sleeves 22. The coupling is used to connect together the ends of two pipes 24. As is apparent, the two ends of this connector may be sized differently, to join together two differently-sized pipes.

Having thus described the various parts of coupling 10, the installation of the coupling onto the end of pipe 24 will now be disclosed. Pipe 24 has an internal layer of a polymeric material, a middle layer of reinforcing fibers and a polymeric coating over the reinforcing fibers. Coupling connector 14 is slid onto inner support 12, followed if desired, by retaining element 16 and slip-positioning element 18 and snap ring 60. Outer sleeve 22 is slid over the end of pipe 24. Inner support 12 is then inserted into bore 26 of pipe 24, which generally involves the application of significant external force. To one or more of inner support 12, bore 26, slips 20 and sleeve 22, may be applied grease or lubricant, and a hydraulic ram may be used to drive inner support 12 into pipe 24.

Once inner support 12 is inserted into the end of the pipe, slips 20 are positioned around the pipe, adjacent to abutment 46. If a slip-positioning element 18 is used, it is positioned between the plurality of slips 20 and abutment 46, and slots 76 of slips 20 are fitted over projections 74 of slip positioning element 18. Inner surface 78 will then be positioned opposite gripping portion 30 of inner support 12. Outer sleeve 22 is then slid over the plurality of slips 20 and forced downwards onto the slips until a wedge-lock has been created. The wall of pipe 24 will be compressed between slips 20 and inner support 12, and teeth 36 and 37 will be driven into gripping engagement with surfaces 97 and 98, respectively. Retaining element 16 is then threaded onto threaded portion 90 of outer sleeve 22 to secure the wedge-lock, and coupling 10 is thereby reversibly fixed onto the end of pipe 24.

Coupling connector 14 may then be coupled to a connector that is part of a second coupling at the end of another length of composite pipe, to join the two ends of pipe together. This may be accomplished by lining up holes 62 with corresponding holes on an adjacent connector, inserting bolts therethrough, and tightening the bolts, as is well known in the art. Or, coupling connector 14 may be connected to a connector on a storage tank, a tool or to other equipment, as is well known in the art. It is noted that because coupling connector 14 may be a separate component that fits over inner support 12, a coupling 10 of this invention may be able to be applied to a number of different uses simply by changing coupling connector 14.

Coupling 10 may be used in a number of other applications, for instance on a hollow tension member, on a hose such as a stainless steel braided hose or on aluminum pipe.

The following example is intended only to illustrate and describe the invention rather than limit the claims that follow.

EXAMPLE

Following is an example of a pipe fitting that may be used with a composite pipe that has an inner diameter of about 3 inches, and a tolerance of 3.02–3.11 inches. The outer diameter is about 3.9 inches and the thickness of the pipe wall is about 0.45 inches. The inner diameter has a tolerance of 3.02–3.11 inches. The inner support 12 is made out of 4130 carbon steel alloy, which is resistant to stress corrosion cracking, and the other components of coupling 10 are made from 1018/1020 carbon steel alloy.

In the exemplary embodiment for a pipe as noted above, the inner support 12 has a gripping portion 30 that is about 5.69 inches long. The outer diameter of the gripping portion 30 is 3.063 inches. The diameter of bore 61 is 2.5 inches. Teeth 36 have a surface 44 that is 0.033 inches long, and the distance from tip 40 to adjacent tip 40 is 0.100 inches. Angle $\alpha$ is 15°.

In slip-positioning element 18, the six projections are evenly spaced from one another and are made from 0.5 inch long, 0.25 inch diameter steel pins that are inserted into a hole. They extend a distance 75 of 0.25 inches from the surface of element 18.

Each slip 20 is 7.00 inches long, with inner surface 78 extending for 6.00 inches of this length. The slips are 0.615 inches thick at the thickest end of the slip. The individual slips are cut from a cylinder. The composite pipe is calculated to have an outside diameter of about 3.75 inches after compression, and therefore a cylinder with an inner diameter of about 3.75 inches, cut with a cut size of about 0.100 inches, will generate six slips 20 useful in this coupling. Angled surface 80 is displaced by an angle $\beta$ of 4°+/−0.25° from inner surface 78. Angle $\gamma$ is 15°. The teeth are formed as described above for inner support 12. Slots 76 are 0.26 inches deep and 0.26 inches wide.

Outer sleeve 22 has a total length of 8.50 inches, of which 1.13 inches is threaded portion 90 with 5.75–6 Acme stub thread. Angle $\epsilon$ is 10'. Frustoconical-interacting surface 86 extends at an angle $\delta$ that is 4°+/−0.25°.

Retaining element 16 has an outer diameter of 6.25 inches and a length of 3.5 inches, 2.12 inches of which is threaded portion 68. The thread is a 5.75–6 stub Acme thread.

While the invention has been described in conjunction with the disclosed embodiments, it will be understood that the invention is not intended to be limited to these embodiments. On the contrary, the invention is intended to cover alternatives, modifications and equivalents, which may be included within the spirit and scope of the invention as defined by the appended claims.

We claim:

1. A pipe coupling, comprising:
   (a) a hollow cylindrical inner support having a longitudinal axis, comprising:
      (i) a first gripping surface about a portion of the outside surface of the inner support;
      (ii) a means for supporting a coupling connector;
   (b) a plurality of slips disposed about said first gripping surface, said plurality of slips forming an outer frustoconical surface and an inner cylindrical surface comprising a second gripping surface;
   (c) a means for preventing the axial movement of said plurality of slips beyond a selected point;
   (d) a hollow outer sleeve disposed about said plurality of slips, and comprising an inside surface corresponding to the frustoconical surface of the plurality of slips;
   (e) a retaining member comprising a means for engaging the outer sleeve to reversibly fix the position of the outer sleeve relative to the plurality of slips;
   (f) a coupling connector disposed about said means for supporting a coupling connector; and
   (g) a means for spacing the plurality of slips about the first gripping surface including a plurality of slots in one of the outer sleeve or the plurality of slips and a plurality of corresponding projections positionable in the slots, the plurality of corresponding projections on the other of the outer sleeve or the plurality of slips.

2. The coupling of claim 1 wherein, at the first gripping surface, the outer circumference of the inner support is selected to be a size that prevents buckling of a pipe when the coupling is installed onto the pipe.

3. The coupling of claim 1 further comprising, a seal disposed about said inner support, said seal being located at a position about the inner support that will be located inside the bore of a pipe when the coupling is installed onto the pipe.

4. The coupling of claim 1 wherein the hollow outer sleeve comprises a threaded portion, and the retaining member has a first end and a second end, the first end comprising a threaded portion to threadedly engage the threaded portion of the hollow outer sleeve, and the second end comprising a shoulder.

5. A splice joint connector, comprising:
   (a) a hollow cylindrical inner support comprising
      (i) two first gripping surfaces about a portion of an outside surface, and
      (ii) two abutments disposed between the two first gripping surfaces,
   (b) two slip assemblies formed from individual slips, each slip assembly being disposed about one of the first gripping surfaces and prevented from axial movement beyond a selected point by one of said abutments, and each slip assembly forming an outer frustoconical surface and an inner cylindrical surface comprising a second gripping surface;
   (c) two hollow outer sleeves, each sleeve being disposed about one slip assembly and each sleeve comprising an inside surface corresponding to the frustoconical surface of the slip assembly about which the one outer sleeve is disposed, and
   (d) two retaining members, each said retaining member comprising a means for engaging one outer sleeve to reversibly fix the position of the one outer sleeve relative to the slip assembly about which the one outer sleeve is disposed.

6. The connector of claim 5 wherein, at each first gripping surface the outer circumference of the inner support is selected to be a size that prevents buckling of a pipe when the connector is installed onto the end of the pipe.

7. The connector of claim 5 further comprising, a seal disposed about said inner support, said seal being located at a position about the inner support that will be located inside the bore of the pipe when the connector is installed onto the pipe.

8. The connector of claim 5 further comprising, a means for spacing the individual slips of one of the two slip assemblies about the first gripping surface about which the one slip assembly is disposed.

9. The connector of claim 8 wherein, one of the two outer sleeves or the one slip assembly about which the one outer sleeve is disposed, comprises a plurality of slots, and the other of the one outer sleeve, or the one slip assembly, comprises a plurality of corresponding projections that are positioned in the slots.

10. The connector of claim 8 wherein, the means for spacing the individual slips in said one slip assembly is a slip-positioning element disposed between one abutment and the one slip assembly.

11. The connector of claim 10, wherein, one of the slip-positioning element or the one slip assembly comprises a plurality of slots, and the other of the slip positioning element or the one slip assembly comprises a plurality of corresponding projections that are positioned in the slots.

12. The connector of claim 10 further comprising, a snap ring disposed about said inner support to hold the slip-positioning element onto the inner support.

13. The connector of claim 5 wherein, at least one of the two hollow outer sleeves comprises a threaded portion, and at least one of the two retaining members has a first end and a second end, the first end comprising a threaded portion to threadedly engage the threaded portion of the at least one hollow outer sleeve, and the second end comprising a shoulder.

14. The connector of claim 10 wherein, at least one of the two hollow outer sleeves comprises a threaded portion, and at least one of the two retaining members has a first end and a second end, the first end comprising a threaded portion to threadedly engage the threaded portion of the at least one hollow outer sleeve, and the second end comprising a shoulder that engages the slip positioning element.

15. A method of installing a coupling connector onto the end of a flexible pipe, said pipe defining a bore and having an inner surface, an outer surface and a wall, comprising:
   (a) providing a hollow cylinder having a longitudinal axis, and having an external gripping surface at one end, a coupling connector at the other end, and an abutment disposed therebetween;
   (b) inserting the external gripping surface into the bore of the pipe;
   (c) disposing a plurality of slips about the outer surface of the pipe at a position opposed to the external gripping surface of the cylinder and at a position adjacent to the abutment, said plurality of slips forming an outer frustoconical surface and an inner cylindrical surface comprising an internal gripping surface;
   (d) spacing individual slips of the plurality of slips about the outer surface of the pipe by disposing a slip-positioning element between the abutment and the plurality of slips, one of the slip-positioning element or the plurality of slips including a plurality of slots, and the other of the slip-positioning element or the plurality of slips including a plurality of corresponding projections that are positioned in the slots to thereby space the individual slips;

(e) forcing an outer sleeve axially onto the plurality of slips, along the longitudinal axis, thereby:
  (i) causing the slips to move axially until restrained by the abutment;
  (ii) compressing the wall of the pipe between the slips and the cylinder;
  (iii) causing the external gripping surface of the cylinder to grip the inner surface of the pipe; and
  (iv) causing the internal gripping surface of the slips to grip the outer surface of the pipe; and
(f) reversibly fixing the position of the outer sleeve relative to the plurality of slips with a retaining element.

16. The method of claim 15, wherein, at the external gripping surface, the outer circumference of the cylinder is selected to be a size that prevents buckling of a pipe when the coupling is installed onto the end of the pipe.

17. The method of claim 15 wherein the cylinder further comprises a seal about said cylinder, said seal being located at a position about the cylinder that will be inside the bore of the pipe when the coupling is installed onto the pipe.

18. The method of claim 15 wherein the retaining element fixes the position of the outer sleeve relative to the plurality of slips by threading onto the outer sleeve and by engaging an end of the plurality of slips.

19. The method of claim 15 wherein the retaining element fixes the position of the outer sleeve relative to the plurality of slips by threading onto the outer sleeve and by engaging the slip-positioning element.

20. The method of claim 15 further comprising the step of disposing a snap ring about said cylinder to hold the slip-positioning element onto the cylinder.

21. A pipe coupling, comprising:
(a) a hollow, substantially cylindrical inner support having a longitudinal axis and an outside surface and including an inner pipe gripping surface on the outside surface;
(b) a plurality of slips positionable about the inner pipe gripping surface, the plurality of slips being fully separable each from the others and together when assembled forming an outer frustoconical surface and an inner surface, the inner surface defining an outer pipe gripping surface;
(c) a slip positioning element for selecting and maintaining the spacing of the slips in the plurality of slips about the inner pipe gripping surface, the slip positioning element including a plurality of slots and a plurality of projections for fitting into and moving along the slots, the slots and the projections being correspondingly positioned on the slips and another part of the coupling;
(d) a stop for limiting the axial movement of the plurality of slips relative to the inner support;
(e) a hollow outer sleeve positionable about the plurality of slips, and including an inner surface corresponding to the outer frustoconical surface formed by the plurality of slips; and
(f) a retaining member to reversibly fix the position of the outer sleeve relative to the plurality of slips.

22. The coupling of claim 21 further comprising a connector at an end of the inner support opposite the inner pipe gripping surface.

23. The coupling of claim 21 further comprising a seal extending about the outside surface of the inner support adjacent the inner pipe gripping surface.

24. The coupling of claim 21 wherein the hollow outer sleeve and the retaining member are reversibly fixed by a threaded connection and the retaining member is anchored on the inner member.

25. The coupling of claim 22 wherein the connector is free to rotate relative to the inner support longitudinal axis.

26. A pipe splice joint connector comprising:
(a) a hollow, substantially cylindrical inner support having a longitudinal axis and an outside surface and including an inner pipe gripping surface on the outside surface;
(b) a plurality of slips positionable about the inner pipe gripping surface, the plurality of slips being fully separable each from the others and together when assembled forming an outer frustoconical surface and an inner surface, the inner surface defining an outer pipe gripping surface;
(c) a stop for limiting the axial movement of the plurality of slips relative to the inner support;
(d) a hollow outer sleeve positionable about the plurality of slips, and including an inner surface corresponding to the outer frustoconical surface formed by the plurality of slips;
(e) a retaining member to reversibly fix the position of the outer sleeve relative to the plurality of slips;
(f) a second inner pipe gripping surface at an opposite end of the inner support;
(g) a second plurality of slips, the second plurality of slips positionable about the second inner pipe gripping surface and together forming an outer frustoconical surface and an inner surface, the inner surface defining a pipe gripping surface;
(h) a second stop for limiting the axial movement of the second plurality of slips relative to the inner support; and
(i) a second hollow outer sleeve positionable about the plurality of slips and including an inner surface corresponding to the outer frustoconical surface formed by the second plurality of slips, the second hollow outer sleeve being reversibly fixable in position relative to the plurality of slips.

27. The coupling of claim 26 wherein the retaining member and the second retaining member are formed as an integral retaining member.

28. The coupling of claim 27 wherein the integral retaining member includes a return at one end thereof for engaging a shoulder on the outer sleeve and threads at an opposite end thereof for threaded connection to the second outer sleeve.

29. The coupling of claim 26 wherein the stops are defined on either side of an annular ring on the inner support.

30. The coupling of claim 26 further comprising a slip positioning element for selecting and maintaining the spacing of the slips in the plurality of slips about the inner pipe gripping surface.

31. The coupling of claim 30 wherein the slip positioning element includes an annular ring and a plurality of projections on the ring, each projection formed to fit into and ride within a slot on the end of a slip in the plurality of slips.

32. A method of installing a coupling connector onto the end of a flexible pipe, said pipe defining a bore and having a wall including an inner surface and an outer surface, the method comprising:
(a) providing a hollow tube having a longitudinal axis, and having a pipe inside gripping surface at one end, an opposite end and an abutment disposed therebetween;

(b) inserting the pipe inside gripping surface into the bore of the pipe;

(c) disposing a plurality of slips about the outer surface of the pipe at a position opposed to the pipe inside gripping surface of the tube and at a position adjacent to the abutment, said plurality of slips each including axial edges and the plurality of slips being positioned without contact between the axial edges, the plurality of slips together forming an outer frustoconical surface and an inner surface defining a pipe outside gripping surface;

(d) forcing an outer sleeve axially onto the plurality of slips, along the longitudinal axis, thereby:
  (i) causing the slips to move axially until restrained by the abutment;
  (ii) compressing the wall of the pipe between the slips and the tube;
  (iii) causing the pipe inside gripping surface of the tube to grip the inner surface of the pipe; and
  (iv) causing the pipe outside gripping surface of the slips to grip the outer surface of the pipe; and (e) reversibly fixing the position of the outer sleeve relative to the plurality of slips with a retaining element, the retaining element fixing the position of the outer sleeve relative to the plurality of slips by threading onto the outer sleeve and by engaging behind the abutment.

33. The method of claim 32 further comprising selecting the tube such that its outer diameter at pipe inside gripping surface is a size that prevents buckling of the pipe when it is compressed between the slips and the tube.

34. The method of claim 32 wherein the retaining element fixes the position of the outer sleeve relative to the plurality of slips by threading onto the outer sleeve and by engaging an end of the plurality of slips.

35. The method of claim 32 further comprising, the step of spacing individual slips in the plurality of slips about the outer surface of the pipe.

36. The method of claim 35 wherein, the individual slips are spaced by disposing a slip-positioning element between the abutment and the plurality of slips.

37. The method of claim 36 wherein the retaining element fixes the position of the outer sleeve relative to the plurality of slips by threading onto the outer sleeve and by engaging against the slip-positioning element.

38. The method of claim 36 further comprising the step of disposing a snap ring about the tube to hold the slip-positioning element onto the tube.

39. A pipe coupling, comprising:
  (a) a hollow cylindrical inner support having a longitudinal axis, comprising:
    (i) a first gripping surface about a portion of the outside surface of the inner support;
    (ii) a means for supporting a coupling connector;
  (b) a plurality of slips disposed about said first gripping surface, said plurality of slips forming an outer frustoconical surface and an inner cylindrical surface comprising a second gripping surface;
  (c) a means for preventing the axial movement of said plurality of slips beyond a selected point;
  (d) a hollow outer sleeve disposed about said plurality of slips, and comprising an inside surface corresponding to the frustoconical surface of the plurality of slips;
  (e) a retaining member comprising a means for engaging the outer sleeve to reversibly fix the position of the outer sleeve relative to the plurality of slips;
  (f) a coupling connector disposed about said means for supporting a coupling connector; and
  (g) a means for spacing the slips in the plurality of slips about the first gripping surface including a slip-positioning element disposed between the means for preventing axial movement of the plurality of slips and the plurality of slips wherein, one of the slip-positioning element or the plurality of slips comprises a plurality of slots, and the other of the slip-positioning element or the plurality of slips comprises a plurality of corresponding projections that are positioned in the slots.

40. The coupling of claim 39 wherein, at the first gripping surface, the outer circumference of the inner support is selected to be a size that prevents buckling of a pipe when the coupling is installed onto the pipe.

41. The coupling of claim 39 further comprising, a seal disposed about said inner support, said seal being located at a position about the inner support that will be located inside the bore of a pipe when the coupling is installed onto the pipe.

42. The coupling of claim 39 further comprising, a snap ring disposed about said inner support to hold the slip-positioning element onto the inner support.

43. The coupling of claim 39 wherein the hollow outer sleeve comprises a threaded portion, and the retaining member has a first end and a second end, the first end comprising a threaded portion to threadedly engage the threaded portion of the hollow outer sleeve, and the second end comprising a shoulder that engages the slip positioning element.

44. A pipe coupling, comprising:
  (a) a hollow cylindrical inner support having a longitudinal axis, comprising:
    (i) a first gripping surface about a portion of the outside surface of the inner support;
    (ii) a means for supporting a coupling connector;
  (b) a plurality of slips disposed about said first gripping surface, said plurality of slips forming an outer frustoconical surface and an inner cylindrical surface comprising a second gripping surface;
  (c) a means for preventing the axial movement of said plurality of slips beyond a selected point;
  (d) a hollow outer sleeve disposed about said plurality of slips, and comprising an inside surface corresponding to the frustoconical surface of the plurality of slips;
  (e) a retaining member comprising a means for engaging the outer sleeve to reversibly fix the position of the outer sleeve relative to the plurality of slips;
  (f) a coupling connector disposed about said means for supporting a coupling connector;
  (g) a means for spacing the plurality of slips about the first gripping surface including a slip-positioning element disposed between the means for preventing axial movement of the plurality of slips and the plurality of slips; and
  (h) a snap ring disposed about said inner support to hold the slip-positioning element onto the inner support.

45. The coupling of claim 44 wherein, at the first gripping surface, the outer circumference of the inner support is selected to be a size that prevents buckling of a pipe when the coupling is installed onto the pipe.

46. The coupling of claim 44 further comprising, a seal disposed about said inner support, said seal being located at a position about the inner support that will be located inside the bore of a pipe when the coupling is installed onto the pipe.

47. The coupling of claim 44 wherein, one of the slip-positioning element or the plurality of slips comprises a plurality of slots, and the other of the slip-positioning element or the plurality of slips comprises a plurality of corresponding projections that are positioned in the slots.

48. The coupling of claim 44 wherein the hollow outer sleeve comprises a threaded portion, and the retaining member has a first end and a second end, the first end comprising a threaded portion to threadedly engage the threaded portion of the hollow outer sleeve, and the second end comprising a shoulder that engages the slip positioning element.

49. A method of installing a coupling connector onto the end of a flexible pipe, said pipe defining a bore and having an inner surface, an outer surface and a wall, comprising:
(a) providing a hollow cylinder having a longitudinal axis, and having an external gripping surface at one end, a coupling connector at the other end, and an abutment disposed therebetween;
(b) inserting the external gripping surface into the bore of the pipe;
(c) disposing a plurality of slips about the outer surface of the pipe at a position opposed to the external gripping surface of the cylinder and at a position adjacent to the abutment, said plurality of slips forming an outer frustoconical surface and an inner cylindrical surface comprising an internal gripping surface;
(d) spacing individual slips of the plurality of slips about the outer surface of the pipe by disposing a slip-positioning element between the abutment and the plurality of slips;
(e) disposing a snap ring about said cylinder to hold the slip-positioning element onto the cylinder;
(f) forcing an outer sleeve axially onto the plurality of slips, along the longitudinal axis, thereby:
(i) causing the slips to move axially until restrained by the slip-positioning element;
(ii) compressing the wall of the pipe between the slips and the cylinder;
(iii) causing the external gripping surface of the cylinder to grip the inner surface of the pipe; and
(iv) causing the internal gripping surface of the slips to grip the outer surface of the pipe; and
(g) reversibly fixing the position of the outer sleeve relative to the plurality of slips with a retaining element.

50. The method of claim 49 wherein, at the external gripping surface, the outer circumference of the cylinder is selected to be a size that prevents buckling of a pipe when the coupling is installed onto the end of the pipe.

51. The method of claim 49 wherein, the cylinder further comprises a seal about said cylinder, said seal being located at a position about the cylinder that will be inside the bore of the pipe when the coupling is installed onto the pipe.

52. The method of claim 49 wherein, one of the slip-positioning element or the plurality of slips comprises a plurality of slots, and the other of the slip-positioning element or the plurality of slips comprises a plurality of corresponding projections that are positioned in the slots and thereby space the individual slips.

53. The method of claim 49 wherein the retaining element fixes the position of the outer sleeve relative to the plurality of slips by threading onto the outer sleeve and by engaging the slip-positioning element.

54. A pipe coupling, comprising:
(a) a hollow, substantially cylindrical inner support having a longitudinal axis and an outside surface and including an inner pipe gripping surface on the outside surface;
(b) a plurality of slips positionable about the inner pipe gripping surface, the plurality of slips being fully separable each from the others and together when assembled forming an outer frustoconical surface and an inner surface, the inner surface defining an outer pipe gripping surface;
(c) a slip-positioning element for selecting and maintaining the spacing of the slips in the plurality of slips about the inner pipe gripping surface, the slip-positioning element including a ring extending out from the inner support and being positioned to act as a stop for limiting the axial movement of the plurality of slips relative to the inner support;
(d) a hollow outer sleeve positionable about the plurality of slips, and including an inner surface corresponding to the outer frustoconical surface formed by the plurality of slips; and
(e) a retaining member to reversibly fix the position of the outer sleeve relative to the plurality of slips.

55. The coupling of claim 54 further comprising a connector at an end of the inner support opposite the inner pipe gripping surface.

56. The coupling of claim 55 wherein the connector is free to rotate relative to the inner support longitudinal axis.

57. The coupling of claim 54 further comprising a seal extending about the outside surface of the inner support adjacent the inner pipe gripping surface.

58. The coupling of claim 54 wherein the slip-positioning element further includes a plurality of projections on the ring, each projection formed to fit into and ride within a slot on the end of a slip in the plurality of slips.

59. The coupling of claim 54 further comprising, a snap ring disposed about said inner support to hold the ring in position on the inner support.

60. The coupling of claim 54 wherein the hollow outer sleeve and the retaining member are reversibly fixed by a threaded connection and the retaining member is anchored on the inner member.

61. The coupling of claim 54 wherein the hollow outer sleeve and the retaining member are reversibly fixed by a threaded connection and the retaining member is anchored against the slip positioning element.

62. A method of installing a coupling connector onto the end of a flexible pipe, said pipe defining a bore and having a wall including an inner surface and an outer surface, the method comprising:
(a) providing a hollow tube having a longitudinal axis, and having a pipe inside gripping surface at one end, an opposite end and an abutment disposed therebetween;
(b) inserting the pipe inside gripping surface into the bore of the pipe;
(c) disposing a plurality of slips about the outer surface of the pipe at a position opposed to the pipe inside gripping surface of the tube and at a position adjacent to the abutment, said plurality of slips each including axial edges and the plurality of slips being positioned without contact between the axial edges, the plurality of slips together forming an outer frustoconical surface and an inner surface defining a pipe outside gripping surface;
(d) spacing individual slips in the plurality of slips about the outer surface of the pipe by disposing a slip-positioning element between the abutment and the plurality of slips;
(e) forcing an outer sleeve axially onto the plurality of slips, along the longitudinal axis, thereby:

(i) causing the slips to move axially until restrained by the slip-positioning element;
(ii) compressing the wall of the pipe between the slips and the tube;
(iii) causing the pipe inside gripping surface of the tube to grip the inner surface of the pipe; and
(iv) causing the pipe outside gripping surface of the slips to grip the outer surface of the pipe; and
(f) reversibly fixing the position of the outer sleeve relative to the plurality of slips with a retaining element, the retaining element fixing the position of the outer sleeve relative to the plurality of slips by threading onto the outer sleeve and by engaging against the slip-positioning element.

63. The method of claim 62 further comprising selecting the tube such that its outer diameter at pipe inside gripping surface is a size that prevents buckling of the pipe when it is compressed between the slips and the tube.

64. The method of claim 62 further comprising the step of disposing a snap ring about the tube to hold the slip-positioning element onto the tube.

65. A method of installing a coupling connector onto the end of a flexible pipe, said pipe defining a bore and having a wall including an inner surface and an outer surface, the method comprising:
(a) providing a hollow tube having a longitudinal axis, and having a pipe inside gripping surface at one end, an opposite end and an abutment disposed therebetween;
(b) inserting the pipe inside gripping surface into the bore of the pipe;
(c) disposing a plurality of slips about the outer surface of the pipe at a position opposed to the pipe inside gripping surface of the tube and at a position adjacent to the abutment, said plurality of slips each including axial edges and the plurality of slips being positioned without contact between the axial edges, the plurality of slips together forming an outer frustoconical surface and an inner surface defining a pipe outside gripping surface;
(d) spacing individual slips in the plurality of slips about the outer surface of the pipe by disposing a slip-positioning element between the abutment and the plurality of slips;
(e) disposing a snap ring about the tube to hold the slip-positioning element onto the tube;
(f) forcing an outer sleeve axially onto the plurality of slips, along the longitudinal axis, thereby:
(i) causing the slips to move axially until restrained by the slip-positioning element;
(ii) compressing the wall of the pipe between the slips and the tube;
(iii) causing the pipe inside gripping surface of the tube to grip the inner surface of the pipe; and
(iv) causing the pipe outside gripping surface of the slips to grip the outer surface of the pipe; and
(g) reversibly fixing the position of the outer sleeve relative to the plurality of slips with a retaining element.

66. The method of claim 65 further comprising selecting the tube such that its outer diameter at pipe inside gripping surface is a size that prevents buckling of the pipe when it is compressed between the slips and the tube.

67. The method of claim 65 wherein the retaining element fixes the position of the outer sleeve relative to the plurality of slips by threading onto the outer sleeve and by engaging an end of the plurality of slips.

68. The method of claim 65 wherein the retaining element fixes the position of the outer sleeve relative to the plurality of slips by threading onto the outer sleeve and by engaging behind the abutment.

69. The method of claim 65 wherein the retaining element fixes the position of the outer sleeve relative to the plurality of slips by threading onto the outer sleeve and by engaging against the slip-positioning element.

\* \* \* \* \*